United States Patent [19]

Stearns

[11] 4,000,518
[45] Dec. 28, 1976

[54] SIGNAL DETECTION DURING VARIABLE SPEED TAPE MOVEMENTS

[75] Inventor: Ralph Stearns, Englishtown, N.J.

[73] Assignee: Bell Telephone Laboratories, Incorporated, Murray Hill, N.J.

[22] Filed: May 12, 1975

[21] Appl. No.: 576,900

[52] U.S. Cl. .................. 360/74; 179/100.1 PS; 360/63; 360/72
[51] Int. Cl.² .................. G11B 15/18; G11B 15/06; G11B 27/22; G11B 15/52
[58] Field of Search ............... 360/74, 72, 71, 27, 360/69, 63; 179/100.1 VC, 100.1 PS, 100.1 TC; 35/35 C, 9 A; 340/171 A; 328/141; 226/24, 43

[56] References Cited
UNITED STATES PATENTS

| | | | |
|---|---|---|---|
| 3,084,226 | 4/1963 | Moulic, Jr. | 360/74 |
| 3,261,111 | 7/1966 | Johnson et al. | 35/6 |
| 3,294,924 | 12/1966 | Fein | 179/100.1 |
| 3,539,734 | 11/1970 | Tsuchiya | 360/63 |
| 3,550,288 | 12/1970 | Svala et al. | 35/8 |
| 3,587,180 | 1/1971 | Richt | 360/74 |
| 3,665,117 | 5/1972 | Staar | 179/100.1 VC |
| 3,711,657 | 1/1973 | Niioka et al. | 179/100.1 VC |
| 3,804,993 | 4/1974 | Honnold et al. | 360/72 |
| 3,812,532 | 5/1974 | Crosser et al. | 360/74 |

OTHER PUBLICATIONS

J. A. Calder et al., Automatic Electric Technical Journal, An Automatic Call Simulator for Training TSPS Operators, July 1971, pp. 286–292.

Primary Examiner—Alfred H. Eddleman
Attorney, Agent, or Firm—Martin S. Landis

[57] ABSTRACT

A signal detection arrangement is disclosed for detecting signals during variable speed tape movements such as during tape rewinding or fast forward speeds. To elaborate, information encoded as multifrequency information tones is grouped in exercises on a recording tape, and at least two low frequency tones are provided at the beginning of each exercise. Each of these low frequency tones has a frequency which is related to the frequency of a different one of the information tones by a multiple of the ratio of the rewind speed to the normal forward speed times a predetermined factor. Accordingly, during normal playback these low frequency tones will not be detected. However, during fast forward or rewind, each of these tones will be multiplied up to a detectable frequency. Moreover, even over wide variations in these "fast" speeds, at least one of these low frequency tones will be detected.

8 Claims, 7 Drawing Figures

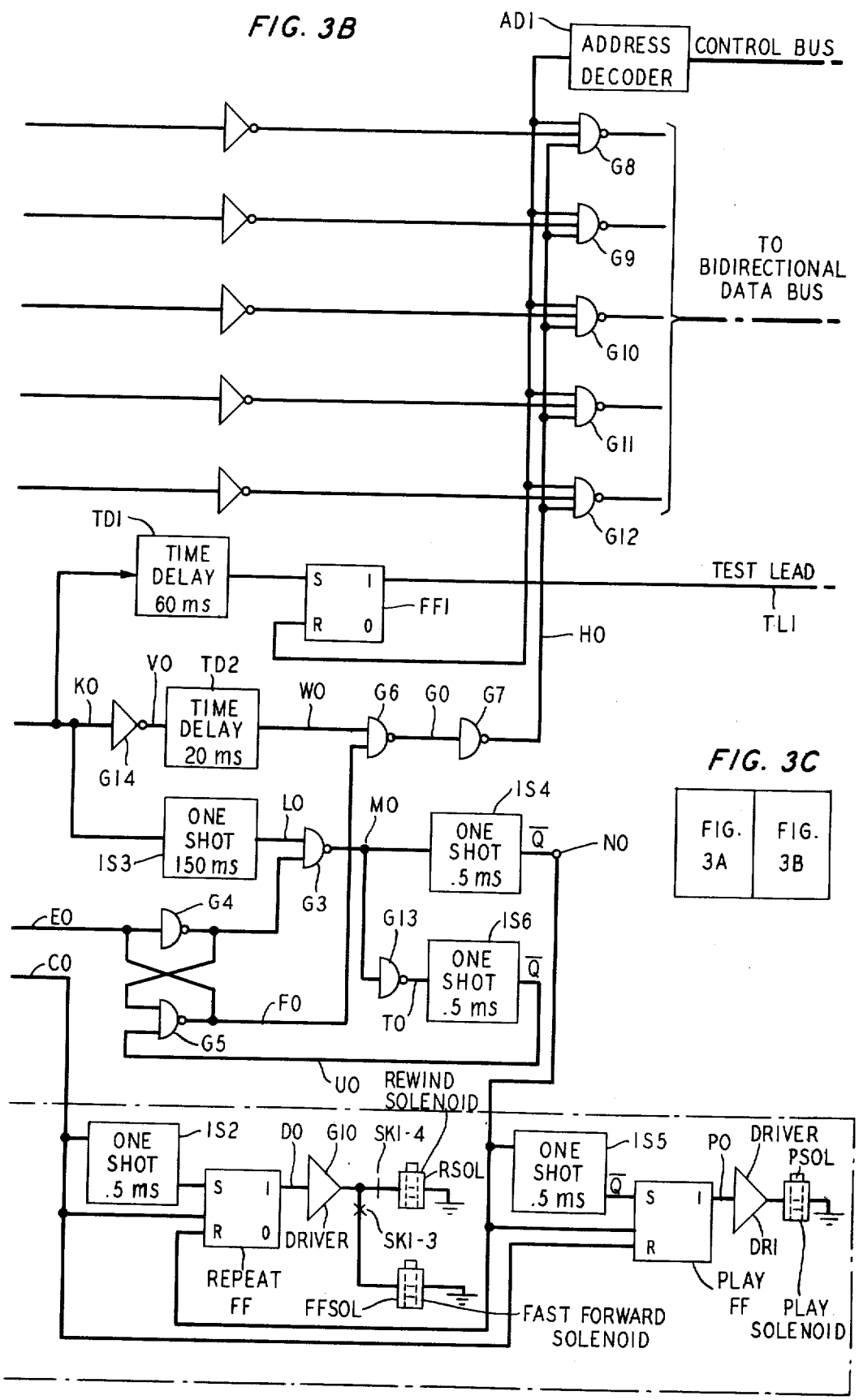

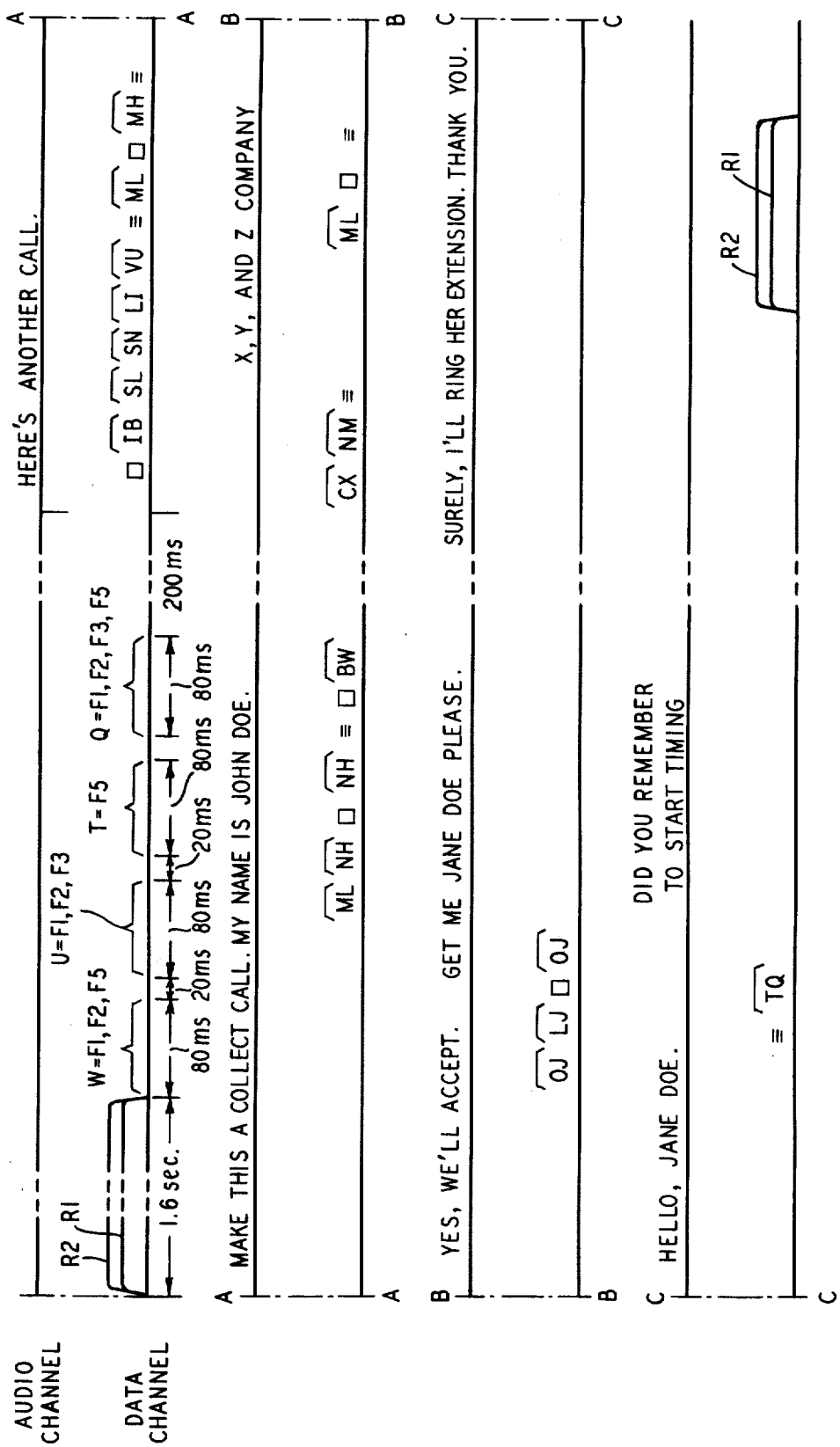

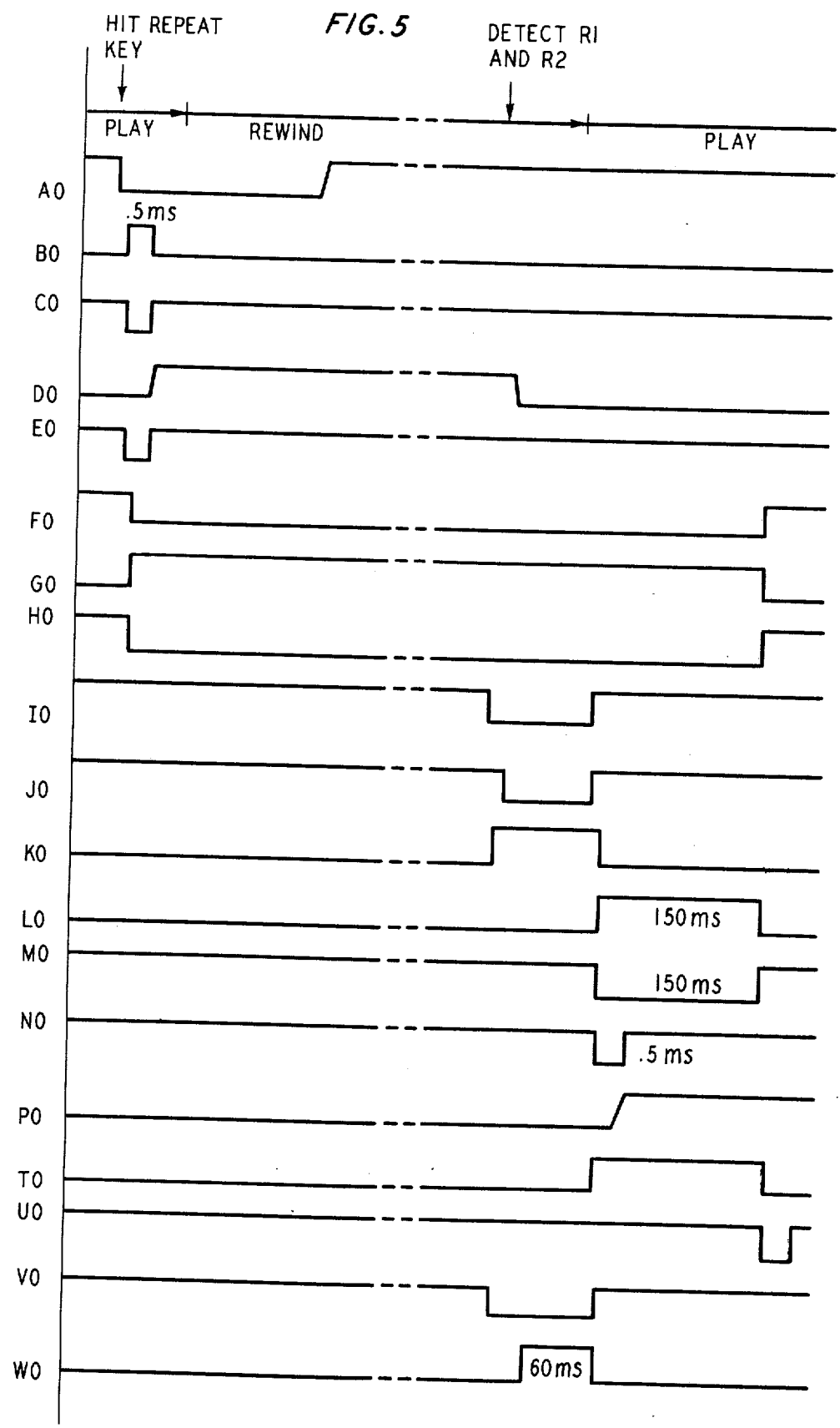

SIGNAL DETECTION DURING VARIABLE SPEED TAPE MOVEMENTS

FIELD OF THE INVENTION

This invention pertains to signal detection apparatus for use with recording tapes and, more specifically, to signal detection apparatus for detecting tones during rewinding or fast forward speeds. Even more particularly, this invention pertains to the detection of "beginning of exercise" tones during rewinding or fast forward speeds, which speeds may vary considerably due to external variables.

BACKGROUND OF THE INVENTION AND PRIOR ART

Information is often grouped on recording tapes in the form of exercises. These exercises are distinguished from each other by blank spaces on the tape, or by distinctive tones at the beginning of each exercise, or by address information at the beginning of each exercise. The grouping of information on tapes into exercises allows great versatility to the user of the tape by providing a mechanism adaptable to skip back and forth to desired exercises or segments thereof.

Many prior art arrangements have been developed to indicate the beginning of exercises for use with "repeat" and "skip" features. In the "repeat" feature, the depression of a repeat key or other switch causes the tape player to rewind the tape to the beginning of the instant exercise and then to play back the tape at the normal forward speed. In the "skip" feature, the depression of a skip key or similar switch causes the tape to assume a fast-forward mode until the next exercise is reached at which time the tape returns to its normal playback speed.

In one prior art end-of-message-detection arrangement, small holes were provided in the tape at the end of each message and a brush was provided to engage a contact through the tape when a hole passed in front of the brush. This appears to be a usable arrangement; however additional "end-of-message" detection equipment is required and, moreover, it is believed to be commercially difficult to mass-produce tapes having holes at the appropriate places therein.

In another prior art arrangement, a constant out-of-band tone was provided with the message, and separations between messages were left completely blank. Thus in this arrangement the failure to detect the out-of-band tone indicated the beginning of a message. Utilization of this arrangement may require expensive high quality tape without the normal oxide deformities found on regular grade tape.

In still another prior art arrangment, a two-channel tape was provided in which a distinctive tone was placed on one channel of the tape — only at the end of each exercise. A tone detector detected this distinctive tone and was adapted to increment an up-down counter each time one of these distinctive tones was encountered during playback. This counter was also adapted to decrement its count each time one of these distinctive tones was encountered during rewinding. The operator of the system stopped the rewinding when the counter reached the desired count, normally 0, indicating the beginning of the instant message. This arrangement appears to be effective; however, one channel of the tape is dedicated to provide end-of-message information, and additional circuitry is required to detect the end-of-message indications and control the counter.

In another prior art arrangement, a tape information system is disclosed in which short silent periods are provided between each message and in which circuitry is adapted to detect these silent periods to disengage the tape transport from either a fast-forward or rewinding mode. This arrangement too appears to be efficient; however, it may be desirable to include silent periods within messages, particularly in training environments in which, during a message, time must be provided for the user to complete the functions specified by a portion of the message.

Still another prior art arrangement discloses an audio tape information system utilizing a two-channel tape. Message and address information are provided on one channel while START and STOP indications for each of the messages are provided in corresponding positions on the other channel. The user is able to select the address of the next message and, accordingly, may skip to any message on the tape as indicated by the address information thereon. Circuitry is provided to count the number of end-of-message indications encountered on the tape during playback to indicate the address of the instant message. This address is compared with the desired address and, when a match occurs, the tape is stopped.

It is an object of this invention to detect signals on a recording tape during fast forward or rewind speeds while minimizing the circuitry and information on the tape dedicated to this function.

It is a further object of this invention to detect such signals over wide variations in the repeat of fast-forward speeds.

SUMMARY OF THE INVENTION

In accordance with the principles of my invention, the "beginning of message" indications may be provided on the same channel as information encoded in the form of multifrequency tones. These beginning of message indications are in the form of low frequency tones which are not detectable during the normal forward playback of the recording tape. However, during the fast forward or rewinding of the tape, these beginning of message tones are multiplied up to the frequency of different ones of the normal detectable frequencies so that they are detectable as multifrequency information tones. Moreover, at least two different low-frequency tones are provided having different relationships to the normal information tones. Accordingly, even over wide variations in the fast-forward or rewind speeds, at least one of these low frequency tones will be detectable as one of the normal information tones.

In this one illustrative embodiment of my invention, the recording tape is adapted for normal playback at a speed of 1⅞ inches per second (IPS) and is also adapted for rewinding or fast forward at a speed of 40 IPS. Accordingly, during rewind or fast forward, all tones on the tape appear at 21.3 (i.e., 40/1.875 = 21.3) times their frequency during the normal playback mode. By providing a low frequency during the normal playback mode. By providing a low frequency tone having a frequency approximately equal to 1/21.3 times the frequency of one of the information tones, the low frequency tone will not be detectable during normal playback, but will be multiplied up to the frequency of the one information tone during the "fast speeds". Thus the end or beginning of a message indication can be provided on the same channel as the actual information and, moreover, the same circuitry utilized to detect the information tones can also be utilized to detect the beginning or end of message information.

In many tape players, the forward speed of the tape is precisely controlled by the use of a capstan and pinch roller, as hereinafter explained. However, the "fast" speeds of these machines are not as precisely controlled and, accordingly, these fast speeds may vary considerably based upon changes in line voltage, lubrication of the tape player, the way in which the tape is rewound and many other variables. If all the low frequency tones were of a frequency precisely 1/21.3 times the frequency of different ones of the information tones, and if the tape player went slower or faster than its normal "fast" speed, then each of the low frequency tones could be multiplied up to a frequency in between one of the detectable tones.

To overcome this problem, in accordance with the principles of my invention at least two low frequency tones are provided having different numerical relationships to the detectable frequencies. For example, if the tape is adapted for playback at a speed of X inches per second and is adapted for rewinding at a speed of Y inches per second, and if $f1$ and $f2$ are each the frequency of a different one of the normally detectable information tones, and if a first tone detector is provided to detect any tone having a frequency within $f1/z$ to $f1z$; and if a second tone detector is provided to detect any tone having a frequency within $f2/z$ to $f2z$, then the first low frequency tone could have a frequency equal to $(X/Y) f1z-Q$, and the second low frequency tone could have a frequency equal to $(X/Y) f2z^{+Q}$ where $z > 1$ and $0 < Q < 1$, as hereinafter described more fully. Since the first low frequency should be multiplied up to a frequency below F1 but still detectable by the first tone detector, and the second low frequency tone should be multiplied up to a frequency above F2 but still detectable by the second tone detector, even though the fast speed is above or below its normal speed, at least one of these low frequency tones should be detected. To elaborate, if the first tone detector is adapted to detect any tone ranging in frequency from $f1/z$ to $f1z$; and if a second tone detector is adapted to detect any tone ranging from $f2/z$ to $f2a$ then the first low frequency tone could have a frequency equal to $x/y f1z^{.5+.25k}$ and the second low frequency tone could have a frequency equal to $x/y f2z^{-(.5+.25k)}$ where K is less than or equal to 2, as hereinafter described more fully. Moreover, by carefully choosing the frequencies of all tones, including the information tones, even if the "fast" speeds vary considerably, one low frequency tone will be detected albeit not by the one detector which normally would detect that tone.

To elaborate the principles of my invention are also applicable to arrangements in which three or even more low frequency tones ar provided. Moreover, if the fast forward and rewind speeds are different, then two groups of low frequency tones could be provided at selected places on the tape with one group of low frequency tones being detectable during rewinding and the other groups being detectable during fast forward speed.

In accordance with a feature of my invention at least two low frequency tones are provided on a recording tape, which tones are of frequencies which are multiplied up to detectable frequencies during the fast forward and/or rewind speeds of the tape. The detection of these low frequency tones can be utilized to control circuitry adapted to control the speed and direction at which the tape is moved.

In accordance with still another feature of my invention, these low frequency tones are selected to have different relationships to the frequencies of the information tones so that even over wide variations of the "fast speeds" at least one of these tones can be detected.

BRIEF DESCRIPTION OF THE DRAWING

The foregoing as well as other objects, features and advantages of my invention will be more apparent from a description of the drawing in which:

FIGS. 3A and 3B, when combined as shown in FIG. 3C, illustrate the circuitry in the tape player interface of FIG. 2 which is adopted to provide a repeat or skip feature in accordance with one illustrative embodiment of my invention;

FIG. 4 illustrates a typical training tape exercise; and

FIG. 5 illustrates various time relationships associated with the utilization of circuitry depicted in FIGS. 3A and 3B.

GENERAL DESCRIPTION

In this one illustrative embodiment of my invention, multifrequency tones are provided on one channel of a recording tape in blocks to form exercises on the one channel. Also at the start of each exercise on the one channel, two or more low frequency tones are provided to indicate the start of an exercise. a cassette tape player, described hereinafter, is provided to read the information on the tape and has a nominal forward speed of 1 ⅞th inches per second and a nominal rewind or fast forward speed of 40 inches per second. Accordingly, when the tape is played during rewinding or fast forward speeds, the frequency of tones thereon all, including the low frequency information tones, will be multiplied to a frequency 21.3 times their frequency during normal playback. Thus, during normal playback the low frequency tones are not detectable; however, during the faster speeds these tones are detectable as one of the normal information tones, as hereinafer explained.

Five predetermined tone frequencies are utilized for information tones in this one illustrative embodiment. All these frequencies are chosen within one octave to avoid the problem of harmonics. The first frequency tone f1 was arbitrarily chosen as 3000 Hertz and the tone detectors, which are described hereinafter, are adopted to detect any frequency tone within approximately ±5 percent of the midpoint tone (actually from $fn/z$ to $fnz$ where $z=1.05$). Moreover, about a 5 percent undetectable range of frequencies is provided between each of the frequency bands. Thus, for example $f_2 = f_1z^3 = f_1(1.05)^3$. The table below indicates the frequency of the five information tones, $f1$ through $f5$ (i.e., midpoint frequency) and the respective frequency range of tones which are detectable by each of the five tone detectors.

TABLE

|    | ~ −5% | midpoint | ~ +5% |
|----|-------|----------|-------|
| f1 | 2857  | 3000     | 3150  |
| f2 | 3308  | 3473     | 3647  |
| f3 | 3829  | 4020     | 4221  |
| f4 | 4432  | 4654     | 4887  |
| f5 | 5131  | 5388     | 5657  |

The manner in which suitable low frequency tones are chosen will now be described. With reference to line 1 of FIG. 1, the frequency bands detectable around frequencies $f2$, $f3$ and $f4$ is illustrated. The low frequency tones RA and RB have been respectively chosen here so that they will be multiplied up (by 21.3) to a frequency 2½ percent above the midpoint frequency of $f2$ (i.e., $f2z^Q$ where $z = 1.05$ and $Q = .5$, halfway between 3473 and 3647) and 2½ percent below the midpoint frequency of f4 (i.e., $f4z^{-Q}$ where $z = 1.05$ and $Q = .5$, halfway between 4432 and 4654).

Figure 1:
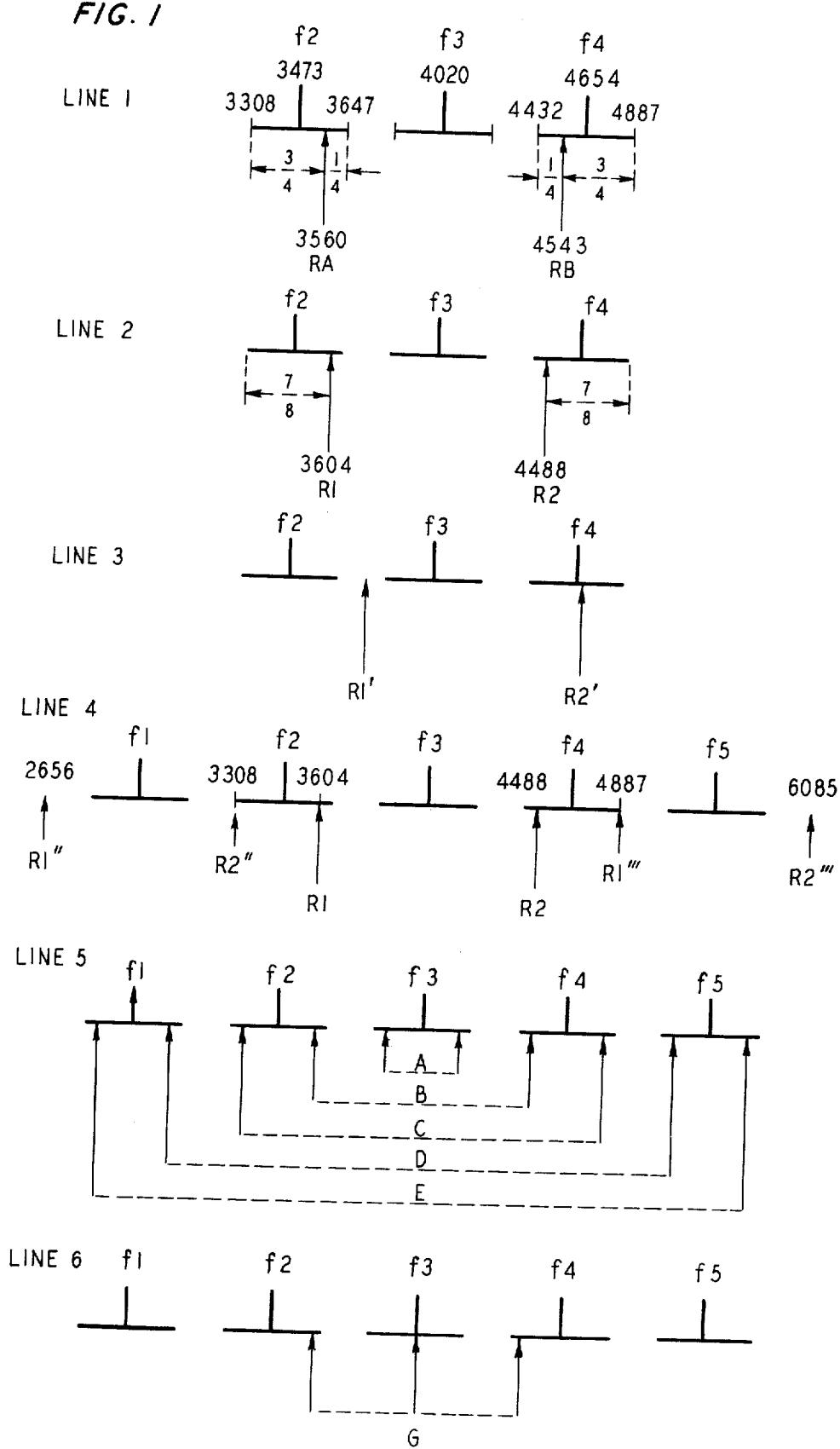
FIG. 1 diagrammatically illustrates various choices of frequencies for information tones and choices of low frequency tones in accordance with several illustrative embodiments of my invention.

Line 2 of FIG. 1 illustrates another choice of low frequency tones. Tone R1 is chosen so that when multiplied up (by 21.3) it will assume a frequency 3.75 percent above f2 (i.e., 3604 hertz, $f2z^{.5+.25k}$, where $k=1$ and $z=1.05$) and tone R2 is chosen to be 3.75 percent below the midpoint frequency of tone f4 (i.e., 4488 hertz, $f4z^{-(.5+.25k)}$ where $k=1$ and $z=1.05$). Thus, the actual frequencies of R1 and R2 are 169 and 210 Hz respectively (i.e., $3604/_{21.3}$ and $4488/_{21.3}$).

Now with reference to line 3 of FIG. 1, it is assumed that the fast speeds are over 21.3 times the normal play speed. Accordingly, low frequency tones R1 and R2 are multiplied up to higher frequencies than 3604 and 4488, respectively. Now tone R1 is multiplied up to a frequency between the detectable range of tones $f2$ and $f3$ as indicated by the designation R1'. Thus, tone R1' will not be detected; however, low frequency tone R2' will be multiplied up to a frequency designated by R2' which is detected as tone f4. Accordingly, even when the tape player rewinds faster than expected, at least one of the low frequency tones is still detectable.

Line 4 of FIG. 1 illustrates the range of frequencies over which one of the tones R1 and R2 is still detectable. Assuming that the tape player is rewinding or operating in a fast foward mode slower than normal (e.g., $29.5 < y < 40$), then tones R1 and R2 would be multiplied to frequencies lower than expected. When tone R1 is multiplied to a tone below the range detectable as tone $f1$ as indicated by designation R1'', then tone R2 is still detectable a f2, as indicated by designation R2''.

On the other hand, assuming that these fast speeds are faster than expected (e.g., $40 < y < 54$), then tone R1 can still be detected as $f4$ even though tone R2 is well above the detectable frequency range for tone f5. Thus tone R1, as indicated by R1''' is detectable as f4 even when tone R2, as indicated by designation R2''', is above the frequency range of tone $f5$. Thus in this one example, tone R1 could vary from 2656 Hz to 4887 Hz and at least one of the tones R1 and R2 would always be detected. Accordingly, tone R2 could vary from 3308 Hz to 6085 Hz and at least one of the tones R1 and R2 would always be detectable.

Thus, in accordance with an aspect of my invention, at least one of the low frequency tones can be detectable even over wide ranges in rewind or fast forward speeds. Moreover, additional circuitry is not required to detect these low frequency tones. With reference to the above example, the frequency of tone R1 when multiplied ranges from a nominal frequency of 3604 Hertz to 4887 Hertz (i.e., R1'''). Thus the "fast" speeds could vary by ±35 percent and at least one of the low frequency tones would still be detectable.

To generalize, the prior example still further, with reference to line 5 of FIG. 1, it is seen that where the detection range of each of a group of detectors is percentage wise twice the separation between frequency ranges, then any of the depicted five sets of paired frequencies A through E can be utilized. Pair A permits the speed to vary over the widest range but it may be undesirable to have two frequencies detected by the same tone detector. Pair B eliminates this problem and, as previously described in regard to lines 2, 3 and 4 of this figure, can still vary over a large range. The three remaining pairs can vary over correspondingly smaller detection ranges. To generalize the above still further, given a multiplicity of tone detectors having center frequencies, $f1, f2 \ldots fn$, and each having detection ranges, $fn/z$ to $fnz$ where $z$ is greater than 1, chosen such that the lower limit of each and every tone detector is $z^k$ times the upper limit of the next lower existing tone detector (therefore $fn=fn-1Z^{(2+k)}$), where k is less than or equal to 2 and is related to the band between detectable frequencies, then the two low frequency tones (R1 and R2) may be calculated by the expression $x/y$ $FZ^{(1.5+.75k)}$ and respectively $x/y$ $FZ^{-(1.5+.75k)}$. For an odd number of tone detectors F is the center frequency of the center tone detector (e.g., for three tones $F = f2 = \sqrt{f1f3}$) and for an even number of tone detectors F is the geometric mean of the center frequencies of the central pair of tone detectors, (e.g., for two tones, $F = \sqrt{f1f2}$).

Line 6 of FIG. 1 illustrates still another choice of low frequency tones designated g. Now three rather than two low frequency tones are utilized. One advantage of using three tones is that the maximum departure from the center frequency of the detectors is less with three frequencies as opposed to two.

Figure 2:
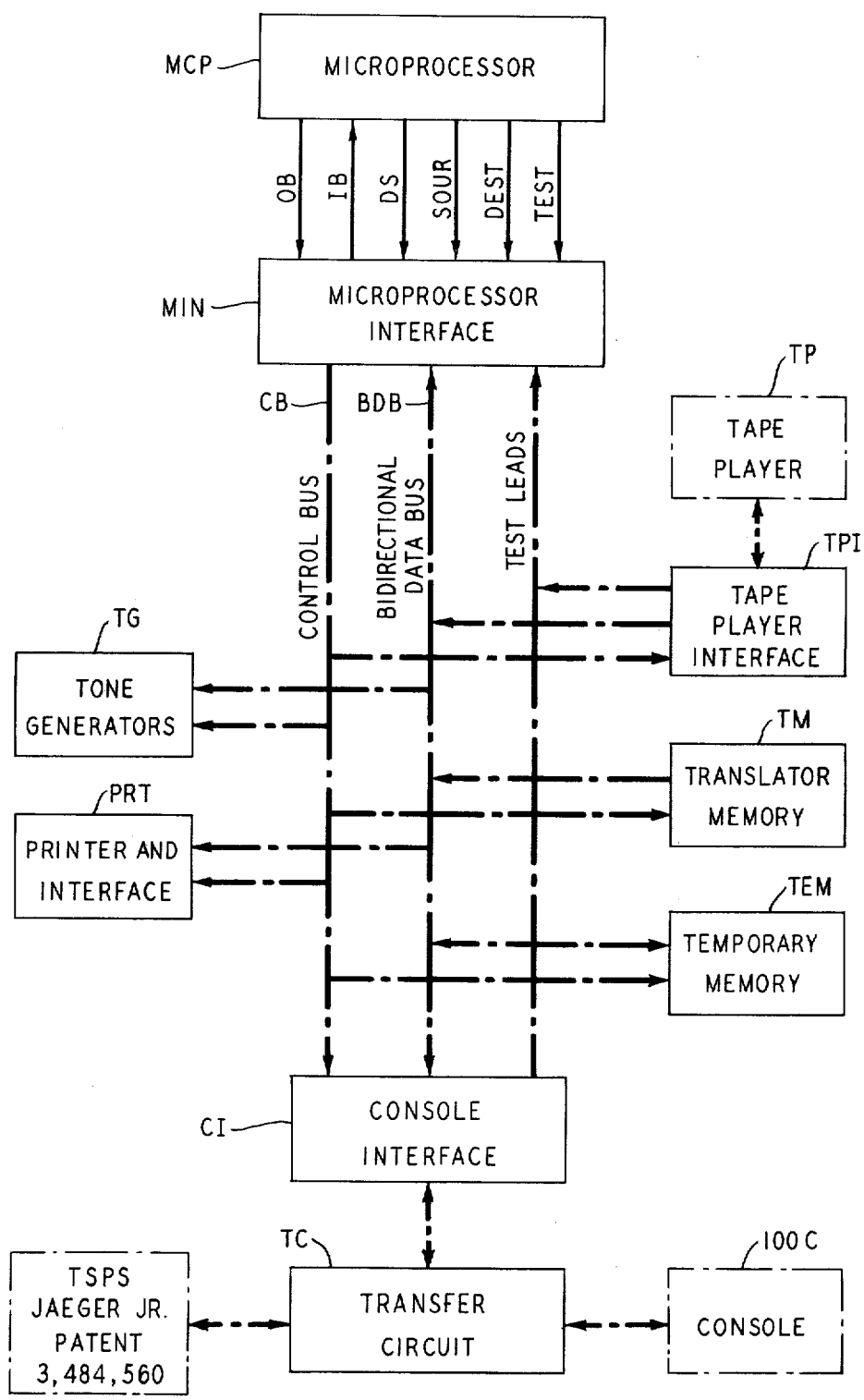
FIG. 2 illustrates in block diagram form operator training arrangement in which one illustrative embodiment of my invention can be utilized.

FIG. 2 illustrates in block diagram form, an operator training arrangement in which my invention can be utilized. This arrangement is adopted to train operators in providing assistance for certain types of telephone or related calls. The operators depress keys on consoles to control, for example, the deposit of coins and the completion of calls to the desired station. Many types of calls can be handled by the consoles, and each presents a unique and distinctive problem to the operator. The operator must be trained to properly respond to each of the calls in order to provide efficient service. Thus, because of the complexity of the console and the system associated therewith, in the past distinct training units have been provided on which to train operators. One such unit is disclosed in great detail in D. F. Johnston et al., U.S. Pat. No. 3,261,111, issued July 19, 1966. This training equipment is adapted to train operators to handle the live consoles utilized in the telephone service position system (TSPS) disclosed in R. J. Jaeger, Jr. et al. U.S. Pat. No. 3,484,560, issued Dec. 16, 1969.

The arrangement disclosed in FIG. 2 is designed to provide an improved data processing arrangement to replace the electromechanical arrangement disclosed in the above mentioned Johnston patent. More specifically, microprocessor MCP is an eight-bit data processing unit for performing logical and arithmetic operations on data in accordance with its stored program. This program is designed to perform almost all logical functions previously performed by relays and other such circuitry in the Johnston arrangement. The arrangement in FIG. 2 handles the basic training function in a manner essentially identical to that disclosed by Johnston; more specifically, "write codes" are utilized to pose questions to the operator trainee. This is accomplished by lighting various lamps on the console and providing an audio indication to the operator that service is required. The operator should respond to the lighting of lamps by giving the proper voice responses and also by pressing the appropriate keys. "Read codes" are also executed by the arrangement. These read codes indicate the correct answers or operators responses. If the operator responded correctly, then the program continues and another set of write and read codes is executed. If the operator has not responded correctly, the system waits for the proper response before proceeding.

The arrangement shown in FIG. 2 is easier to operate and is more adaptable than the hardwired arrangement disclosed by Johnston. For example, a two channel cassette tape player TP is provided to replace the punched tape and magnetic tape recorder required in the Johnston arrangement. Moreover, transfer circuit TC in FIG. 2 is provided so that console 100C can be utilized in either a live mode handling calls from the TSPS or in a training mode handling simulated calls from microprocessor MCP. An ignition type switch (not shown) is provided to switch the leads in the console to either the TSPS system or to the console interface circuit CI which is utilized for training purposes. An interlock arrangement is provided so that the ignition key can be turned only if the operator's headset associated with the console is not plugged in. This prevents the key from being accidentally turned and thereby inadvertently changing the console from a live to a training mode or vice versa.

Now turning more specifically to the circuitry in FIG. 2, microprocessor MCP can be any one of the various microprocessing units presently used today. For example, microprocessor MCP could be the data processing system disclosed in R. W. Sevcik application Ser. No. 450,896, filed Mar. 13, 1974, now U.S. Pat. No. 3,931,505. This processor has eight output leads symbolically designated OB over which eight-bit words are sent to the peripheral devices and eight input leads designated IB over which eight-bit data words are received from the peripheral devices. Four leads designated DS are provided to specify a four-bit address to select a peripheral device and four destination leads DEST and three source leads SOUR are also provided to designate that the microprocessor is sending data to or receiving data from a specified peripheral device. Microprocesor interface circuit MIN is provided to combine the eight output leads OB and eight input leads IB into a bidirectional data bus BDB. Circuit MIN also combines the device select leads, source leads and destination leads into control bus CB which serves to address the peripherals. Five test leads TEST also extend through circuit MIN to microprocessor MCP and serve, inter alia, to indicate that a peripheral device has information which is required by the microprocessor.

Tone generators TG are provided to simulate the various tones utilized in the telephone system such as audible ringing, busy tone, reorder tone, no circuits available tone and zip tone. These tones are provided by three oscillators which generate 440, 480 and 620 Hertz tones. The on and off cycles for the various simulated tones are controlled by a 960 Hertz square wave oscillator and a divider circuit. Printer PRT is provided to record the various digits keyed by the operator trainee.

Tape player TP is a well-known commercially available cassette tape player adapted for playback at a speed of 1⅞th IPS and for rewind or fast forward at a speed of 40 IPS. This tape player has manual controls for stop, play, rewind, and fast forward modes. Repeat and skip modes are also provided in accordance with the principles of my invention, as hereinafter explained more fully. The various tape player modes can also be controlled by the microprocessor by applying information over bidirectional data bus BDB through tape player interface circuit TP1.

Translator memory TM is provided to translate the data (multifrequency information tones) from the cassette tape into 24-bit words utilized to light and extinguish lamps at the console and also to translate certain three out of nine codes generated at the console into $x$ out of five codes for the console displays and for the printer.

Temporary memory TEM is provided to temporarily store data that is variable with each training call. This data includes the codes of keys that must be operated during a call segment and any calling, called or special numbers must be displayed when requested.

Figure 3A:
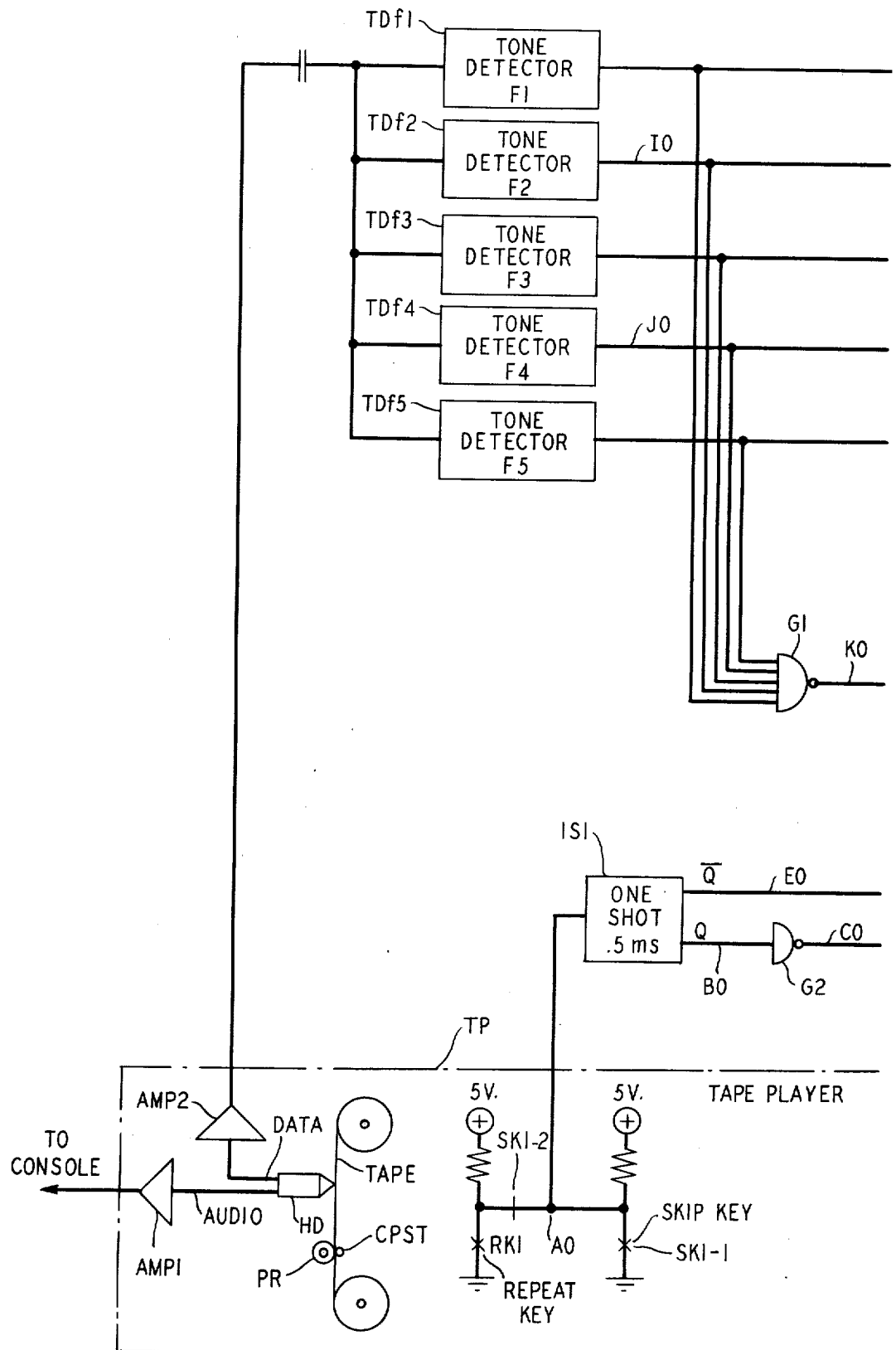

FIGS. 3A and 3B illustrate the detailed circuitry in the tape player interface TPI previously described in regard to FIG. 2. Tape player TP is also shown in generalized form at the bottom of FIG. 3. Tape player TP includes a play solenoid PSOL, a fast forward solenoid FFSOL and a rewind solenoid RSOL. When solenoid PSOL is activated, tape TAPE is pulled past head HD at a speed of 1⅞th IPS. Tape TAPE is a two channel tape and head HD is symbolic of two heads required to read information from the channels of the tape. One channel of the tape contains audio information which is read off the tape and passed through amplifier AMP1 to the operator's headset, as hereinafter described. The data portion on the other channel consists of groups of multifrequency tones $f1$ through $f5$, as previously mentioned. These tones are first amplified by amplifier AMP2 and then applied to each of the tone detectors TDf1 through TDf5. As mentioned previously, each of these tone detectors is adopted to detect tones within approximately ±5 percent of their midpoint detection frequency. For example since the frequency of tone $f1$ is 3000 Hertz, tone detector TD$f1$ is adopted to detect tones between the frequencies of 2857 and 3150 (i.e.,, 3000/1.05 and (3000)(1.05)), as indicated by the preceding table. Normally the outputs from the tone detectors are HIGH and a tone detector generates a LOW output only when a tone is detected within its frequency range. Each of these tone detectors may comprise well known phase locked loops, such as those described on page 18 et seq. of the March, 1972 issue of *Electromechanical Design*.

To facilitate an explanation of the operation of the circuitry in FIG. 3, a sample exercise will now be described in some detail and then the utilization of the skip and repeat features will be described.

Now turning to FIG. 4, a simple exercise is shown indicating the information on corresponding portions of the audio and data channels on tape TAPE. Assuming that flip-flop PLAY of FIG. 3 is set, then driver DR1 will apply a high voltage to play solenoid PSOL and accordingly tape TAPE will move past head HD at a speed of 1⅞th IPS. In this play direction, the speed of the tape is precisely controlled by a synchronously motor driven capstan CPST and pinch roller PR. The first tones read from the data channel on tape TAPE are low frequency tones R1 and R2 as shown in FIG. 4. As described previously in regard to line 2 of FIG. 1, these tones have frequencies of 169 Hertz and 210 Hertz, respectively. In the play direction these tones are well below the detectable frequencies and accordingly are not detected. Thus, after approximately 1.6 seconds, the next tone on the data channel is encountered. This first information tone lasts for 80 milliseconds and is designated by the letter W, which indicates that the tone comprises each of the frequencies $f1$, $f2$ and $f5$. Accordingly, tone detectors TD$f1$, TD$f2$ and TD$f5$ should each generate LOW output signals. Gate G1 would then generate a HIGH output signal to indicate that a tone has been detected. Responsive to the HIGH output of gate G1, time delay TD1 generates a HIGH output signal after a 60 millisecond delay to set flip-flop FF1. Test lead TL1 then goes HIGH to indicate to microprocessor MCP in FIG. 2 that a tone has been detected. With reference to FIG. 2, this test lead TL1 extends through tape player interface circuit TPI and through microprocessor interface MIN to microprocessor MCP. Responsive to the HIGH state of test lead TL1, microprocesssor MCP in accordance with its stored program, applies an address to control bus CB to interrogate tape player interface TPI. More specifically, responsive to this address, address decoder AD1 in FIG. 3, generates a HIGH output pulse to reset flip-flop FF1 and to enable gates G8-G12 to gate the information from tone detectors TD$f1$-TD$f5$ in the form of a five-bit binary word to microprocessor MCP over bidirectional data bus BDB. Also responsive to the LOW output from gate G1, gate G14 generates a HIGH output which is applied to time delay TD2. This delay generates a HIGH output after a delay of 20MS. Then responsive to the HIGH outputs from delay TD2 and gate G5, gate G6 applies a LOW output to gate G7 which generates a HIGH output partially enabling gates G8-G12 so that they are responsive to the output from decoder AD1, as described above.

Then with reference to FIG. 4, in the 20 millisecond silent period after W was detected, microprocessor MCP awaits the reception of further tones. To elaborate, at the end of this 20 millisecond period, tone U consisting of tones $f1$, $f2$ and $f3$ is detected by the tone detectors and another five bit data word identifying tone U is applied to microprocessor MCP in a manner identical to that previously described.

In accordance with its program, microprocessor MCP responds to the detection of multifrequency tones W and U by first extinguishing all lamps on the console. This is accomplished by first addressing translator memory TM in FIG. 2 over the control bus CB and then applying an address over bus BDB to memory TM. The information on bus BDB serves to address information in memory TM. Responsive to this address, memory TM applies translated data back to bus BDB. Microprocessor MCP then utilizes control bus CB to apply the translated information on bus BDB through console interface CI and transfer circuit TC to the console. This information is applied to the console in the form of 24-bit serial words.

In a similar manner, microprocessor MCP addresses tone generator TG and responsive to new information on bus BDB all tone generators are turned off. Microprocessor MCP also controls transfer circuit TC via console interface CI to inhibit the audio channel (output of amplifier AMP1 in FIG. 3) from being applied to the console.

In a manner identical to that previously described in regard to information symbols (multifrequency tones) W and U, information symbols T and Q (comprising X of the 5 tone $f1$-$f5$) are read from the tape and applied to microprocessor MCP. Responsive to information symbols T and Q, microprocessor MCP restores the audio connection from the tape player to the console by operating a relay (not shown) in transfer circuit TC.

With reference to FIG. 4, the operator trainee than hears a narrator say "Here's another call". While the trainee was hearing the word "here's", information symbol □ is detected on the tape. This symbol also comprises specified ones of the five frequency tones $f1$-$f5$. This symbol indicates "write codes" are to follow. As mentioned previously, these write codes control the system to present a simulated call to the trainee. More specifically, responsive to the letters I and B, microprocessor MCP lights the non-coin lamp on the console by sending a 24-bit serial word to the console interface CI via the bidirectional data bus. Similarly, responsive to symbols S and L, S and N, and L and I; the loop 1 called lamp, the loop 1 access lamp, and the start lamp are respectively lit at the appropriate times.

Responsive to symbols V and U, microprocessor or MCP controls the tone generators TG to apply a zip tone to the console at the appropriate time. More specifically, when the symbol ■ is reached each of the previously mentioned lamps are lit and the zip tone is generated. All lamps are lit at the same time to simulate actual calling conditions. Symbol ■ also indicates to the microprocessor that "read" information is to follow. Symbols M and L indicate that a check should be made to ensure that the trainee has verbally responded to the service request. Then the symbol □ indicates to the microprocessor that a write code follows. Letters M and H indicate to the microprocessor that the start lamp on the console is to be later extinguished if the voice check has been satisified. Then upon reaching the symbol ■ , the processor stops the playing of the tape and waits for the voice check to be satisfied. Hopefully, the trainee should now say "May I help you?". A voice detection circuit, not shown, is included in transfer circuit TC to detect whether or not the trainee has responded verbally to the new call. This voice detector so informs the microprocessor. Assuming that the operator has verbally responded, the tape continues and the calling party then says "Make this a collect call. My name is John Doe". The symbols ML and NH now represent further read codes specifying conditions the trainee must satisfy. Responsive to symbols M and L, the microprocessor expects to receive an indication from the voice detector that the trainee has responded hopefully by saying "thank you". The symbols N and H indicates that the trainee should now depress the station collect key. As mentioned previously, symbol □ indicates that the information that follows is a write code. Thus, now responsive to symbols NH and ■ if the trainee has depressed the station collect key then the microprocessor will control the console to light the station collect lamp. To elaborate, the depression of station collect key generates a unique three out of nine code which is applied by the transfer circuit TC to the colsole interface CI in FIG. 2. This circuit so informs microprocessor MCP that it has information utilizing one of the test leads and then microprocessor MCP then receives such information over data bus BDB. When the symbol ■ is reached, the tape is stopped until all outstanding read conditions are satisfied.

Assuming that the trainee responded properly, then symbol ☐ is encountered indicating that a write code follows. Responsive to symbol BW, microprocessor MCP controls tone generators TG to apply an audible ringing signal to the console. This is accomplished by connecting a tone generator output to the headset. Slightly later to simulate that the called party has answered, symbols C and X are encountered and audible ringing is stopped under the control of microprocessor MCP. The loop 1 called lamp is then extinguished responsive to the detection of symbols N and M. The called party then answers by indicating that this is the "x y and z company". Hopefully, the trainee will then indicate to them that there is a collect call. Thus, responsive to symbols M and L, a voice check is made and the tape is stopped at symbol ■ until the operator verbally responds. The called party then accepts the call by saying "yes, we will accept". The trainee should then depress the start timing key and position release keys as indicated by symbols O and J, and L and J as read codes. If the operator responds correctly, then responsive to symbols ☐ and O and J, the microprocessor controls the console to light the start timing lamp upon depression of the start timing key and to extinguish all position lamps and cut off the remainder of the recorded tape conversation upon depression of the position release key. The call then continues in the manner indicated.

REPEAT AND SKIP FEATURES

The preceding has described how the microprocessing arrangement of FIG. 2 operates to implement a training sequence in accordance with the sample exercise described in regard to the FIG. 4. Assuming now that the operator trainee became confused in the middle of the exercise, and, for example, forgot to say "thank you", then, a voice check (ML ☐ ■ ) was not satisfied and the tape would not proceed. To give the trainee another opportunity to successfully complete the entire exercise, a repeat key is provided. Depression of the repeat key controls the tape player to rewind the tape to the beginning of the exercise. More specifically, the tape will rewind only until at least one of the low frequency tones decoded at the beginning of the exercise is detected. As mentioned previously, each of these tones during the rewinding mode will be multiplied up to a frequency detectable as different ones of the information tones $f1-f5$.

Now turning to FIG. 3 depression of the repeat key closes make contact RK1 in FIG, 3A, and accordingly the voltage at point AO goes LOW. FIG. 5 illustrates the voltages at points AO through WO during the operation of the repeat feature, and may be consulted throughout the following discussion to facilitate an understanding of the operation of the circuitry in FIG. 3. Responsive to the fall of voltage at point AO one-shot circuit 1S1 generates a 0.5 millisecond positive pulse on lead BO. This pulse is inverted by gate G2 and applied to flip-flop REPEAT and flip-flop PLAY resetting both these flip-flops. Accordingly, the one output of flip-flop PLAY goes LOW, deenergizing play solenoid PSOL. This controls the tape player to stop movement of the tape in the forward direction. More specifically, pinch roller PR is retracted and capstan CPST no longer pulls the tape in a forward direction. However, recorder head HD is not retracted but remains in physical proximity to the tape. At the termination of the 0.5 ms negative pulse from gate G2, oneshot circuit 1S2 on the positive going edge of the pulse generates another 0.5 ms pulse to set flip-flop REPEAT. The one output of this flip-flop goes HIGH operating rewind solenoid RSOL. The operation of the rewind solenoid causes the tape player to rewind the tape at approximately 40 IPS. During rewinding no mechanism such as pinch roller PR or capstan CPST is provided to precisely control the speed at which the tape is rewound. Accordingly, this rewind speed varies greatly depending upon present line voltage, lubrication of the tape player, and even the manner in which the tape is wound in its cassette, for example.

During rewinding each of the information tones such as f1 is multiplied up to a frequency far above any of the detectable frequencies. Accordingly, the symbols (e.g., W, U, T, ☐ ) previously discussed are not detectable during rewinding. However during rewinding, low frequency tones R1 and R2 provided at the beginning of the exercise should be multiplied up to frequencies of 3604 Hz and 4488 Hz respectively. These frequencies are detected by tone detectors TD$f$2 and TD$f$4 respectively. Accordingly, leads IO, and JO go LOW and gate G1 generates a HIGH signal on lead KO. When lead KO again goes LOW when neither of the low frequency tones is detected, the one-shot circit 1S3 generates a 150 ms positive pulse. Gate G3 inverts this pulse and applied it to one-shot circuit 1S4. Responsive to the negative going edge of this inverted pulse, circuit 1S4 generates a short negative going pulse on lead NO having a duration of 0.5 ms. This pulse resets flip-flop REPEAT to control rewind solenoid RSOL to stop the tape rewinding. On the positive going edge of the last-mentioned 0.5 ms pulse, one-shot circuit 1S5 generates a short pulse to set flip-flop PLAY. Play solenoid PSOL is then energized and the exercise is then replayed at the normal speed of 1⅞ IPS, in the manner previously described.

As previously described in regard to line 4 of FIG. 1, even if the rewind speed varies greatly at least one of the low frequency tones R1 and R2 is detectable. Such detection may be by any one or more of the tone detectors TD$f$1-TD$f$5. Gate G1 is responsive to the detection of any tone for stopping the rewinding in the manner described above.

During the period in which the tape is being rewound, it is necessary to inhibit the application of any data to the bidirectional data bus. To elaborate, responsive to the depression of the repeat key, one-shot circuit 1S1 also generates a negative going 0.5 ms pulse on lead EO. This sets the flip-flop comprising NAND gates G4 and G5. Accordingly, lead FO goes Low causing the output of gate G6 to go HIGH. Gate G7 then inverts the output of gate G6, and applies a LOW signal to gates G8 through G12 via lead HO. The LOW state of lead HO inhibits the application of any data to the bidirectional data bus during rewinding.

However, when the low frequency tones R1 and R2 are detected as discussed above, the output of gate G1 goes HIGH. As previously mentioned, one-shot circuit 1S3 generates a HIGH going 150 ms pulse which is inverted by gate G3. The output of gate G3 is also applied to gate G13 via lead MO, which again inverts the signal to a HIGH going 150 ms pulse on lead TO. On the negative going edge of this pulse one-shot circuit 1S6 generates a shot negative-going pulse on lead UO having a duration of 0.5 ms. This pulse is applied to gate G5 and serves to reset the flip-flop. Then, the state of lead HO goes HIGH and gates G8–G12 can again apply normal tone information to the bidirectional data bus.

The principles of my invention are equally applicable to signal detection during fast forward speed. If the fast forward speed is the same as the rewind speed as in this illustrative embodiment, then the low frequency tones can have the same frequencies as previously discussed. If, however, the fast forward speed is different, then additional low frequency tones can be added at the start of an exercise, which tones will be multiplied to one of the detectable frequencies during the fast-forward speed.

In this illustrative embodiment of my invention, a skip key is also provided. Depression of this key causes the tape player to skip the remaining portion of the instant exercise, and to resume normal playback speed at the start of the next exercise. The implementation of the skip feature is essentially identical to that of the repeat feature previously described. The depression of the skip key operates contacts SK1-1, SK1-2, SK1-3 and SK1-4. Contact SK1-2 opens to disconnect the repeat key from lead AO, and contact SK1-1 closes to ground lead AO in a manner identical to that previously described in regard to depression of the repeat key. Contacts SK1-3 and SK1-4 also operate to disconnect rewind solenoid RSOL from driver G10, and connect fast forward solenoid FFSOL to this driver. Depression of the skip key causes the energization of solenoid FFSOL and the tape goes into a fast forward mode. Then when low frequency tones R1 and R2, depicted at the start of the next exercise at the bottom of FIG. 4, are detected solenoid FFSOL is deenergized and solenoid PSOL is energized and the tape is returned to its normal forward speed. The operation of the circuitry in FIG. 3 in performing the skip function is essentially identical to that previously described in regard to performing the repeat function, the only exception being that flip-flop REPEAT now controls the fast forward solenoid FFSOL rather than rewind solenoid RSOL. Moreover, even over wide variations in the fast forward speeds, at least one of the low frequency tones R1 and R2 are detectable by tone detectors TD$f$1–TD$f$5.

What is claimed is:

1. For use in an information system comprising a recording tape having a plurality of blocks of information tones of predetermined frequencies stored thereon, said tape being adapted for playback in one direction at a speed of X inches per second and adapted for rewinding in the other direction at a speed of Y inches per second where Y is greater than X, and also comprising a plurallity of tone detectors each adapted during the playing of said tape in said one direction to detect tones of a different one of said predetermined frequencies and to provide a unique detection signal responsive thereto, apparatus for stopping the rewinding of said tape at the beginning of one of said blocks comprising control means for controlling the rewinding of said tape and for providing a rewind indication, said each tone detector also being adapted during the rewinding of said tape to detect any tone within the frequency range from $fn/z$ to $fnz$, where $fn$ is said predetermined frequency detectable thereby and to provide said unique detection signal responsive thereto, said tape having first and second low frequency tones stored thereon at the beginning of said one block, said first and second low frequency tones respectively of frequencies $(X/Y)(F1z-Q)$ and $(X/Y)(F2+QF2)$, where F1 is equal to the frequency of one of said predetermined frequency information tones, where F2 is equal to the frequency of another one of said predetermined frequency information tones, and where $z>1$ and $0<Q<1$, means responsive to said unique detection signal from one or more of said tone detectors for providing a stop indication, and means jointly responsive to said stop indication and to said rewind indication for controlling said control means to stop the rewinding of said tape.

2. In combination, a recording tape having information in the form of tones of different frequencies stored thereon, and also having at least two low frequency tones stored thereon, a tape player comprising a tape head adapted to read said information and low frequency tones stored on said tape, first control means for controlling said tape to move across said tape head in a forward playback direction at a speed of X inches per second, and second control means for controlling said tape to move across said tape head in a reverse rewind direction at a faster speed of Y inches per second, a plurality of tone detectors connected to said tape head for receiving the information and low frequency tones read from said tape during tape movements in both said directions, one of said tone detectors generating a first detection signal when a tone read from said tape is within a detection range around the frequency of one of said different frequency information tones, and another of said tone detectors generating a second detection signal when a tone read from said tape is within a detection range around the frequency of another one of said different frequency information tones, said low frequency tones respectively having frequencies $(X/Y)(F1z-g)$ and $(X/Y)(F2z+Q)$ where F1 is the frequency of said one different frequency information tone, where F2 is the frequency of said other different frequency information tone, $z>1$ and $0<Q<1$, switch means for controlling said second control means to control said tape to move in said reverse rewind direction and for providing a rewind indication, and means jointly responsive to said rewind indication and to either or both of said first and second detection signals for controlling said first control means to control said tape to move in said forward playback direction.

3. In combination a recording tape having information specifying tones of different frequencies stored thereon, and also having at least two low frequency tones stored thereon, a tape player comprising a tape head adapted to read said information and low frequency tones stored on said tape, first control means for controlling said tape to move across said tape head in a forward direction at a speed of X inches per second and second control means for controlling said tape to move across said tape head in said forward direction at a faster speed of Y inches per second, a plurality of tone detectors connected to said tape head for receiving the information and low frequency tones read from said tape by said tape head during tape movements at both said forward speeds, one of said tone detectors for generating a first detection signal when a tone read from said tape is within a predetermined percentage range of the frequency of one of said different frequency information tones, and another of said tone detectors for generating a second detection signal when a tone read from said tape is within a predetermined percentage range of frequency of another of said different frequency information tones, said low frequency tones respectively having frequencies $(X/Y)(F1z+Q)$ and $(X/Y)(F2z+Q)$ where F1 is the frequency of said one different frequency information tone, where F2 is the frequency of said other different frequency information tone and where $z>1$ and $0<Q<1$.

switch means for controlling said second control means to control said tape to move in said faster forward speed and for providing a fast forward indication, and means jointly responsive to said fast forward indication and to one or both of said first and second detection signals for controlling said first control means to control said tape to move at said one forward speed.

4. In combination, a recording tape adapted for playback in one direction at a speed of X inches per second and adapted for rewinding in the other direction at a faster speed of Y inches per second, a plurality of blocks of different frequency information tones stored on said tape, and first and second additional low frequency tones stored on said tape at the beginning of at least some of said blocks, said first and second low frequency tones respectively having frequencies $(X/Y)(F1z-Q)$ and $(X/Y)(F2z+Q)$ where F1 is equal to the frequency of one of said different frequency information tones, where F2 is equal to the frequency of another one of said different frequency information tones and where $z>1$ and $0<Q<1$, whereby during rewinding at least one of said low frequency tones is detectable over wide variations in said rewinding speed.

5. In combination, a recording tape adapted for normal playback in one direction at a speed of X inches per second and adapted for fast forward playback in said one direction at a faster speed of Y inches per second, a plurality of blocks of different frequency information tones stored on said tape, and first and second additional low frequency tones stored on said tape at the beginning of at least some of said blocks, said first and second low frequency tones respectively having frequencies $(X/Y)(F1z-Q)$ and $(X/Y)(F2z+Q)$ where F1 is equal to the frequency of one of said different frequency information tones, where F2 is equal to the frequency of another one of said different frequency information tones and where $Qz>1$ and $0<Q<1$, whereby during fast forward playback at least one of said low frequency tones is detectable over wide variations in said faster speed.

6. For use with a recording tape having a plurality of blocks of information tones of a plurality of different frequencies stored thereon and at the beginning of one of said blocks also having first and second low frequency tones stored thereon, said tape being adapted for playback in one direction at a speed of X inches per second and adapted for rewinding in the other direction at a normal faster speed of Y inches per second, said first and second low frequency tones respectively of frequencies $(X/Y)(F1z-Q)$ and $(X/Y)(F2z+Q)$ where F1 is the frequency of one of said different information tones and where F2 is the frequency of another one of said different information tones and where $z>1$ and $0 Q<1$ the method of stopping the rewinding of said tape during variable speed tape rewind movements at the start of said one block comprising the steps of rewinding said tape at a speed variable within a predetermined range of Y, providing a rewind indication, reading said information and low frequency tones from said tape while said tape is being rewound, generating a first detection signal upon detection of a tone having a frequency within the range of F1z and F1z, generating a second detection signal upon detection of a tone having a frequency within the range of F2/z and F2z, and stopping the rewinding of said tape jointly responsive to said rewind indication and to either or both of said first and second detection signals.

7. For use with a recording tape having a plurality of blocks of information tones of a plurality of different frequencies stored thereon and at the beginning of one of said blocks also having first and second low frequency tones stored thereon, said tape being adapted for playback in on direction at a speed of X inches per second and adapted for fast forward in said one direction at a normal faster speed of Y inches per second, said first and second low frequency tones respectively of frequencies $(X/Y)(F1z-Q)$ and $(X/Y)(F2z+Q)$ where F1 is the frequency of one of said different information tones, where F2 is the frequency of another one of said different information tones, and $z>1$ and $0<Q<1$;

the method of stopping the fast forward movement of said tape at the start of said one block during variable speed fast forward movements comprising the steps of moving said tape in said one direction at a speed variable within a predetermined range of Y, providing a fast forward indication, reading said infomation and low frequency tones from said tape during said above-specified moving step, generating a first detection signal upon detection of a tone having a frequency within the range of F1/z to F1z, generating a second detection signal upon detection of a tone having a frequency within the range of F2/z to F2z, where z is a constant, and stopping the fast forward movement of said tape jointly responsive to said fast forward indication and to either or both of said first and second detection signals.

8. For use with a recording tape having a plurality of blocks of information tones of a plurality of different frequencies f1, f2...fN stored thereon, where $F = \sqrt{f1fN3}$ and where $fN = (fN-1)z^{(2+k)}$ and at the beginning of one of said blocks also having first and second low frequency tones stored thereon, said tape being adapted for playback in one direction at a speed of X inches per second and adapted for rewinding in the other direction at a normal faster speed of Y inches per second, said first and second low frequency tones respectively of frequencies $(X/Y)Fz^{-(1.5+.75k)}$ and $(X/Y)Fz^{(1.5+.75k)}$ where F1 is the frequency of one of said different information tons, where F2 is the frequency of another one of said different information tones, and where K is less than or equal to 2 and where $z > 1$, the method of stopping the rewinding of said tape at the start of said one block comprising the steps of rewinding said tape at a speed variable within a predetermined range of Y, providing a rewind indication, reading said information and low frequency tones from said tape while said tape is being rewound, generating a first detection signal upon detection of a tone having a frequency within the range of F1/z to F1z, generating a second detection signal upon detection of a tone having a frequency within the range of F2/z to F2z, and stopping the rewinding of said tape jointly responsive to said rewind indication and to either or both of said first and second detection signals.

* * * * *